United States Patent [19]
Barker

[11] 3,898,181
[45] Aug. 5, 1975

[54] LAYERED RHODIUM AND NICKEL
[75] Inventor: George E. Barker, St. Louis, Mo.
[73] Assignee: Monsanto Company, St. Louis, Mo.
[22] Filed: June 8, 1973
[21] Appl. No.: 368,546

Related U.S. Application Data
[63] Continuation-in-part of Ser. No. 330,531, Feb. 8, 1973.

[52] U.S. Cl........ 252/455 R; 252/466 B; 423/213.5
[51] Int. Cl. .................... B01j 11/08; B01j 11/22
[58] Field of Search .................... 252/466 B, 455 R; 423/213.5, 213.7

[56] References Cited
UNITED STATES PATENTS

| | | |
|---|---|---|
| 3,230,034 | 1/1966 | Stiles............................. 423/213.2 |
| 3,410,651 | 11/1968 | Brandenburg et al. .......... 423/213.2 |
| 3,433,581 | 3/1969 | Stephens et al.................. 423/213.5 |
| 3,554,929 | 1/1971 | Aarons............................... 252/462 |
| 3,809,743 | 5/1974 | Unland et al. .................... 423/213.5 |

Primary Examiner—W. J. Shine

[57] ABSTRACT

The invention concerns a catalyst in which a nickel component is deposited on an inert support, followed by an alumina coating and a rhodium component. The catalyst is particularly useful for removing nitrogen oxides from automotive exhaust.

13 Claims, No Drawings

LAYERED RHODIUM AND NICKEL

This application is a continuation-in-part of my copending application Ser. No. 330,531, filed Feb. 8, 1973.

BACKGROUND OF THE INVENTION

The present invention relates to means of removing noxious materials from engine exhaust and to a dual functional rhodium and nickel catalyst suitable for such purpose. In particular, the invention concerns processes for reducing nitrogen oxides present in exhaust of automotive engines and the use of the addition of air in conjunction with use of rhodium and nickel catalyst of layered structure in such process.

It is well known that combustion is incomplete when hydrocarbons are burned in combustion engines, whether of the internal combustion type or other alternative vehicular power sources. Consequently automotive exhaust contains carbon monoxide and hydrocarbons along with other products of incomplete combustion which are generally considered to be noxious. Among the pollutants formed are nitrogen oxides, termed $NO_x$ (NO and $NO_2$). The $NO_x$ emissions will vary with driving modes, but do not often exceed 0.3 or 0.4% by volume of the exhaust gases, and may average around 0.15%. However, $NO_x$ is definitely classed as a pollutant and much effort has been spent on methods of removing $NO_x$ from exhaust gases.

Noble and other metal catalysts have previously been proposed for use in removing $NO_x$. A problem frequently encountered with such catalysts is the production of ammonia. Ammonia is definitely an undesirable product since it is subject to re-oxidation to $NO_x$ under oxidizing conditions, and such conditions are definitely planned for an oxidation catalyst converter which will oxidize the hydrocarbon and other components of an exhaust gas stream.

The proposals for catalytic removal of $NO_x$ generally involve reduction of the $NO_x$, and therefore employ reducing conditions. Reducing conditions can be obtained by control of the engine air-to-fuel ratio, i.e. by employing a rich air-to-fuel ratio. Such an air-to-fuel ratio produces an exhaust with a relatively high content of oxidizable components compared to the small amount of oxygen present in the exhaust. Therefore a rich air-to-fuel ratio is appropriate for reduction of $NO_x$. However, with many catalysts it has been found that a rich air-to-fuel ratio leads to excessive ammonia formation. The ammonia formation is affected by the ratio of the oxidized components of the exhaust gas and the effects of a rich air-to-fuel ratio on ammonia formation can be mitigated by the addition of air when a rhodium catalyst is used.

It has previously been recognized that temperature has an effect upon the amount of ammonia formation over various noble metal and other catalysts. In particular it has been recognized that ammonia formation with nickel and similar catalysts is much greater at temperatures around 500°C than it is at somewhat higher temperatures. It has therefore been proposed to add air to the exhaust gases so that the resulting oxidation will produce higher temperatures and make the catalytic removal of $NO_x$ more effective with respect to avoidance of ammonia formation. The practice for implementing this procedure has been to add the air in the engine manifold. Equipment adaptable for such addition is already on production model vehicles and addition at this location is consistent with the intention of having a reaction exotherm to raise the temperature in the following $NO_x$ converter. This method of air addition is apparently very satisfactory for its intended purpose of raising the temperature. However the air addition as described herein for a rhodium and nickel layered catalyst is for purposes beyond that of raising the temperature. Nickel catalysts are among those which have been proposed for removal of $NO_x$, and air addition has been used in conjunction with such catalysts to obtain high temperatures. It has also been recognized that various noble metals can be included along with nickel on a support to serve as promoters.

SUMMARY OF THE INVENTION

The present invention concerns a dual functional rhodium and nickel catalyst in which the rhodium and nickel constitute layers on a support. The catalyst is formed by depositing nickel on an inert support, coating the nickel with a high surface area catalyst support material upon which catalytic metals can be dispersed, i.e. alumina, and depositing rhodium on the catalyst support material. The invention is also concerned with use of the described catalyst to remove $NO_x$ from automobile exhaust, with advantages being especially evident is useage over a varying temperature range, and with use of rich carburetion in conjunction with addition of supplemental air to lessen ammonia formation. A catalyst of the described structure is more resistant to physical degradation upon aging that are similar catalysts in which the nickel is deposited upon an activated alumina coating.

DETAILED DESCRIPTION OF THE INVENTION

The present catalysts involve a structure in which nickel is deposited or coated on an inert support and rhodium is dispersed on an alumina coating. The structure can be formed by depositing nickel on an inert support such as a cordierite monolith, then depositing an alumina coating on the nickel, and next depositing rhodium on the alumina. The individual deposition procedures can be carried out in customary manner. The nickel is ordinarily deposited from a solution of nickel salts, followed by drying and calcining. The alumina is ordinarily deposited from a dispersion of alumina powder, followed by drying and calcining. The rhodium is similarly deposited from a solution of rhodium salts, followed by drying and, optionally, calcining. The present catalyst is designed to have the effect of both rhodium and nickel as active components. Nickel is used in fairly high amounts and does not need a support of high surface activity, such as alumina, in order to be well-dispersed and effective. In fact alumina tends to make nickel depositions less stable toward physical degradation upon temperature or other environmental changes, or otherwise, interacts with the nickel and cause poor properties. Therefore the nickel is deposited on an inert surface, such as that of a bare monolith material. By contrast, rhodium is used in very low amounts and must be highly dispersed on a surface of high activity, such as an alumina of high surface area. Therefore an alumina surface is provided prior to deposition of the rhodium. The alumina is therefore deposited on the carrier after the nickel. The nickel, of course, must be available to contact the exhaust gases, so it is apparent that the alumina coating is not a complete coating impervious to gas. The rhodium is then well dispersed upon the alumina surface. In order to obtain the desired effect from very small concentrations of rhodium, it is preferred that the rhodium be well dispersed on the surface of the alumina without much penetration into the alumina. The catalyst can, for simplicity, be viewed as a layered structure in which a nickel coating is present on an inert support, with an alumina layer over the nickel layer, and a rhodium layer over the alumina. However, it will be recognized that irregular, porous materials are involved and that the impregnation procedures involve penetration of materials into the surface. The monolithic structures used have irregular surfaces, and the alumina coatings formed are characteristically of very high surface area. Moreover the amounts of materials and methods of application are not ordinarily such as to produce complete, continuous coatings, but the coatings may have voids and irregularities. Thus the catalysts are referred to herein as layered catalysts only to characterize the structure in a broad sense. The main factor is that the nickel is fixed to a support other than the alumina upon which the rhodium is dispersed. There are advantages in having the nickel dispersed upon an inert support rather than upon alumina.

A variety of procedures can be employed in applying the different components of the present catalysts. Generally the nickel and rhodium components are added by immersion or by spraying appropriate solutions of the compounds. For example, rhodium compounds which can be used include the nitrate, halide, acetonulacetonate, or an appropriate rhodium carbonyl. An appropriate solvent is chosen, depending upon the compound chosen. Thus water solutions of $Rh(NO_3)_3$ suffice, while benzene may be chosen for $Rh_4(CO)_{12}$.

With impregnation procedures, minimum solution techniques have certain advantages, particularly with the low levels of rhodium utilized herein. Thus, if excess solution techniques are employed with aqueous solution of $Rh(NO_3)_3$ or $RhCl_3$, selective absorption can occur resulting in less control as to the amount of active deposited. The use of excess solution techniques, for example in adding rhodium to an alumina coated monolith, however, can be utilized so long as care is taken to account for selective absorption. This generally can be accomplished simply by control of solution concentration and absorption time.

Alumina coatings can be applied in a variety of ways. A suitable procedure involves use of dispersions of alumina poweder, such as can be made conveniently by agitation of alumina powder in aqueous acid. The body to be coated is then dipped in the suspension. When monolithic supports are to be coated it is advantageous to clear the channels of excess solution after dipping, for example by passing a suitable gas through the monolith or by other suitable means. After drying and air calcining at about 500°C, adhering coatings of an appropriate thickness for use in the present invention result.

A suitable procedure for preparing layered catalysts in accord with the present invention can, for example, involve immersion of a monolith in nickel nitrate solution, drying at 110°–200°C, calcining in air at 400° to 600°C; then immersion in an alumina dispersion, drying at 110°–200°C, calcining in air at 400 to 600°C; then immersion in a rhodium nitrate solution and drying at 110° to 200°C. The catalyst can then be used as such, with decomposition of the rhodium nitrate salts if utilized at sufficiently elevated temperatures, such as encountered in treatment of automotive exhaust gases. If desired, the catalyst can be calcined prior to use, e.g. at 400° to 600°C, in air, or, optionally in a reducing atmosphere.

The exhaust treatment procedures of the present invention are effective with rhodium catalyst containing various concentration levels of rhodium. However, because of cost and availability considerations it will generally be desirable to use low concentrations, and there will seldom be any reason for the rhodium exceeding 1% by weight of the support, or even 0.1% by weight thereof. In fact, the rhodium is surprisingly effective at extremely low loadings, substantially less than 0.01% by weight, such as less than 0.005% by weight, or 0.003% or even 0.001% or less by weight of the support. While the procedures herein can employ various rhodium concentrations, the fact that good results can be achieved with very low rhodium loadings is especially significant. The amount of rhodium will generally be in the range of 0.0005 to 0.05 weight parts per 100 weight parts support. The amounts of nickel will generally be in the range of 0.5 to 50 weight parts per 100 weight parts of inert support or more narrowly 1 to 20 weight parts. Five or more weight parts nickel are often used. Amounts of alumina can vary widely but are often in the range of 0.1 or 0.2 to 20 weight parts support. However, there is usually no need to use large amounts of alumina in view of the very small amounts of rhodium to be dispersed, and therefore amounts in the range of 2 to 6 weight parts may be preferable. There may be advantage in keeping the amount of alumina relatively low in order to enhance accessibility of the nickel component of the catalyst, such as having at least as much nickel as alumina on a weight basis or having the amount of nickel at least twice that of the alumina on a weight basis. The parts herein are with reference to rhodium and nickel as metal, although the materials may be in other forms during various conditions of use. The rhodium and nickel are presumably in elemental form when employed under reducing conditions in treatment of automotive exhaust. However they may also exist at times in various oxidized states, such as rhodium or nickel oxides, or various other compounds, and the catalysts are considered within the invention regardless of the particular state of the catalytically active rhodium and nickel components.

The catalysts of the present invention can be utilized for various purposes, including various oxidation and reduction reactions. However they are particularly adapted for the treatment of exhaust from combustion engines by contact at high temperatures to remove pollutants therefrom such as hydrocarbons, carbon monoxide, and especially nitrogen oxides. Rhodium catalysts without a nickel component can be utilized for this purpose but suffer some loss in effectiveness in particular high temperature ranges such as ranges upwards of 700° or 750°C inlet temperatures to catalytic converters. Such temperatures can occur in some phases of engine operation. The present combination catalyst has improved effectiveness at such high temperatures.

The catalysts described herein are particularly suited for removal of $NO_x$ in a procedure in which an engine is operated with a rich air-to-fuel ratio range, and supplemental air is added to the exhaust gas stream prior to contact with the catalyst. The amount of air preferably approaches the maximum which can be added without making the conditions oxidizing in the air-to-fuel ratio operating range. One of the objects of the aforesaid addition of supplemental air is to widen the range of air-to-fuel ratios over which specified levels of $NO_x$ control can be attained and to improve the degree of $NO_x$ control. In view of the results attributed to the supplemental air, it can conveniently be termed "bootstrap air" and that term is at times used herein to designate air added to the exhaust stream in advance of the $NO_x$ converter. A mode of operation involving a rich air-to-fuel ratio and bootstrap air will generally be referred herein as a "bootstrap operation" or mode of operation.

The effectiveness of a system in removing $NO_x$, considering both $NO_x$ reduction and ammonia production, can be summarized by taking, on a molecular basis, the sum of NO and $NH_3$ remaining, as a percentage of the original NO present. For convenience this percentage is sometimes designated herein by the Greek letter Omega $\Omega$. The bootstrap mode of operation with rhodium containing catalyst causes $\Omega$ to remain at low levels over a large range of air-to-fuel ratios.

Air-to-fuel ratios have a significant bearing on the efficiency of the operation of an automobile engine, and also on the composition of the resulting exhaust gases. Such ratios can be reported in terms of percentages of air with respect to stoichiometric, but are commonly referred to as an A/F ratio and reported on a weight basis, e.g. pounds of air per pound of fuel, with the relationship of the A/F ratio to the stoichiometric point being particularly significant. The stoichiometric point may vary somewhat, but is generally around 14.7 pounds air per pound of fuel for gasolines used in automobiles. The A/F ratio can be reported as a $\Delta A/F$, indicating by how many A/F units it differs from stoichiometric, with units on the rich side of stoichiometric being reported as $-\Delta A/F$. An automobile engine has to be adaptable to various driving conditions in the normal course of operations; because of this and other factors, carburetors are ordinarily set to operate over a specified range of $\Delta A/F$ ratios. Presently proposed carburetion control may involve an A/F carburetion range which is one $\Delta A/F$ unit wide, but more precise carburetion controls may make it feasible to operate over a range which is only 0.5 A/F unit wide, or some other more limited range. The presently described bootstrap operation makes it possible to improve results, i.e. lower $\Omega$, particularly at the rich side of an operating range, and is therefore useful with the kind of carburetion contemplated for automobile engines. The bootstrap mode of operation can be used with any of the rhodium catalysts described herein.

The addition of bootstrap air is useful because ammonia production varies with the ratio of oxidizable components to oxygen. It happens that the ratio of CO to $H_2$ in automotive exhaust is ordinarily fairly constant, e.g. usually in the range of about 3.0 to 3.5 and quite often about 3.2. Therefore the relationships involved between oxidizable components and oxygen can conveniently be stated in terms of $CO/O_2$ ratio. The desirable $CO/O_2$ ratios in a bootstrap operation will depend upon the intended $\Omega$ levels, and may vary with the particular rhodium/nickel catalyst or other factors, but will usually be in the range of 1.5 to 5 on a molecular basis or more preferably 1.5 to 3 or 4. Even so, the use of bootstrap operation ordinarily gives some improvement in results if the $CO/O_2$ ratio ranges as high as 10 or 20 or more in certain phases of the operation. Comparable $H_2/O_2$ ratios can be found by dividing any of the foregoing ratios by 3.2, e.g. with desirable ratios usually varying from about 0.44 to 1.56 while recognizing that bootstrap operation may still improve results even with ratios as high as 3 or 6 or more. In view of the possibility of non-selective premature reaction of the oxygen with both CO and $H_2$, it may be at times particularly desirable to state concentrations in terms of the ratios of $H_2$ to $O_2$ as present when the rhodium catalyst is contacted; for such purpose any of the $CO/O_2$ ratios described herein can be divided by 3.2.

It appears that the % of CO in automotive exhaust increases rapidly and substantially linearly with increasing richness of the A/F ratio of the rich side of stoichiometric. Moreover, this is accompanied by some decrease in oxygen content. Thus the $CO/O_2$ ratio ordinarily rises rapidly with the richness of the feed. The addition of bootstrap air serves to moderate this effect. With a larger amount of oxygen present, increases in the CO do not have as great an effect upon the $CO/O_2$ ratio. The result is that the $CO/O_2$ ratio stays at a lower level, and consequently $\Omega$ also remains at low levels over a large range of air-to-fuel ratios.

Automobiles as now designed operate over a range of air-to-fuel ratios, rather than on a particular point, with a range of 1.0 A/F unit being proposed for automobile models of the near future by engineers of a prominent automobile manufacturer. It is desirable to operate solely on the rich side of stoichiometric, since it is not feasible to reduce nitrogen oxides on the lean side of stoichiometric, and substantial operation there will result in substantial discharge of nitrogen oxides into the atmosphere. It follows that operation of an automobile in the contemplated manner will ordinarily involve some operation ranging at least as far on the rich side of stoichiometric as 1.0 $\Delta$ A/F. However operation at $-1.0$ $\Delta$ A/F, i.e. about 13.7 A/F, would not ordinarily provide sufficient oxygen to provent substantial ammonia production, but additional oxygen would have to be added. Yet, if the rich edge of the A/F range were at $-1.0$ $\Delta$ A/F, then the lean edge of a 1 unit wide A/F range would be right at the stoichiometric point and no oxygen could be added (assuming constant percentage addition of oxygen) without providing an excess of oxygen at the lean edge of the operating range and thereby preventing reduction. Therefore in operating under rich conditions for bootstrap operation, even the lean edge is ordinarily on the rich side of stoichiometric by at least a small increment. In the foregoing discussion and unless otherwise specified herein, A/F ratio refers to carburetion and does not take into account the amount of bootstrap air added to the exhaust gases.

If bootstrap air is utilized, the amount added will depend upon the results desired, for example an amount can be added sufficient to permit $\Omega$ to be no higher than 20% at the most in the designated operating range, and preferably no higher than 10%.

As taught herein, the $CO/O_2$ ratio is indicative of the $\Omega$ levels to be obtained. If a particular width of A/F carburetion range is specified, along with error factor on the control of bootstrap air addition and with known variation in CO and $O_2$ with A/F ratios, it is possible to determine the maximum $CO/O_2$ ratio that can occur with a particular percentage bootstrap air addition used to the best advantage under the specified conditions.

Thus the percentage of bootstrap air can be selected to control the $CO/O_2$ ratio at or below a desired level, e.g. 5, 4 or 3. The carburetion range can then be selected so that the lean edge is sufficiently on the rich side that the bootstrap air will place it at or slightly on the rich side of stoichiometric. For example, with ±20% error in the bootstrap air control a 4.3% bootstrap air addition will indicate selection of a carburetion lean edge at about $-0.7$ $\Delta$ A/F. Similarly, 3% bootstrap air will call for about $-0.5$ $\Delta$ A/F on the lean edge and 6% bootstrap air, for about $-0.9$ $\Delta$ A/F on the lean edge.

Ordinarily, for reasons of fuel economy it will be desirable to have the A/F ratio no richer than necessary to insure against non-oxidizing conditions after addition of the bootstrap air, i.e. to have the amount of added air approach the maximum which can be added without making the conditions oxidizing on the lean edge of the A/F range. Of course some of the advantages of the bootstrap operation will be obtained even if the A/F range is richer than necessary. However, in most cases the percent of bootstrap air will approach and be within 20% or so of the maximum which can be added without making the conditions oxidizing on the lead edge, and the bootstrap air will be added in accord with the procedures herein to avoid premature interaction. In general the proper combination of percent of bootstrap air and A/F range should be selected to keep the $CO/O_2$ ratio in a selected range, e.g. 1.5 to 4 or 5.

When bootstrap air is utilized, the percentage employed can vary over wide ranges with desirable effects, e.g. 0.5 to 25% of the exhaust rate. Larger amounts of bootstrap air tend to have a greater effect. However, larger amounts also require a richer A/F ratio and therefore adversely affect fuel economics. Therefore the advantages must be balanced against the economic considerations. Thus a more practical range for operation is 2 to 10% bootstrap air, and amounts in the range of 3 to 6% are generally preferred. It will be understood that for bootstrap operations all of the foregoing ranges will be used with A/F ratios which are sufficiently on the rich side of stoichiometric to avoid oxidizing conditions, in accordance with the teaching herein.

In description of the effects of bootstrap operation herein, particular attention has been devoted to worst case conditions, as customary in engineering design practice. However it should be recognized that the $\Omega$ level will vary over the operating range, and that it may possibly be feasible to select the carburetion richness and bootstrap air rate to obtain desired average levels of $\Omega$, even though the maximum level of $\Omega$ be higher than that ordinarily considered acceptable. Moreover, much of the discussion herein relates to continuous addition of air, for example, addition of a constant percent of the exhaust stream. However, the addition rate could be varied, for example adding large amounts of air to exhaust during carburetion, and adding lesser or no amounts of air when the carburetion is less rich, and such variants are to be considered within the bootstrap operation described herein.

Further description of bootstrap operations with rhodium catalyst is found in copending application Ser. No. 315,066 filed Dec. 17, 1972, and the procedures and variants described there can be employed with the addition procedures described and claimed here.

The foregoing describes the advantages of bootstrap operations. However, in one aspect, in utilizing bootstrap air, it is desirable to add it in a particular manner to achieve the desired effect, as described and claimed in my copending application Ser. No. 324,286 filed Jan. 17, 1973. The air should be added at a location and under conditions such that a suitable amount of oxygen is present and available for reaction with the exhaust gas components upon contact with the catalyst.

Oxygen is, of course, capable of reacting with both carbon monoxide and hydrogen. The extent to which such reactions occur depends upon concentration, temperature, presence or absence of catalyst, and other factors. It has been found that the reaction of bootstrap air with exhaust gases can be selectively directed toward reaction with hydrogen. If the bootstrap air, including its oxygen, is still present and well-mixed with the exhaust gases upon contacting a rhodium catalyst, the oxygen can react with $H_2$ in the gases in preference to CO in such gases. This selectively is apparently dependent upon the rhodium catalyst. In contrast to this, if the oxygen and exhaust gases are permitted to react prior to contacting the catalyst, the reaction is virtually non-selective and substantial amounts of hydrogen may remain in the gases, along with CO, depending upon the overall stoichiometric relationships.

Particular addition procedures described herein are intended to lessen premature, non-selective reaction of the bootstrap air with exhaust gas components. This reaction apparently occurs in a homogeneous phase. Any reaction of the bootstrap oxygen with other exhaust components which occurs prior to contact with the rhodium/nickel catalyst will be referred to herein as a premature reaction. It has been found that excessively high temperatures lead to premature reaction of the air with exhaust gas components. Thus exposure of the gas mixture to such excessively high temperatures should be avoided or minimized. The gases present in the engine manifold are, of course, at a very high temperature. Therefore the bootstrap air should be admixed at a location downstream from the manifold. The time for possible premature reaction of the bootstrap air can be minimized by adding the air as close as possible to the place of initial contact with the rhodium/nickel catalyst. However, it is necessary to have the bootstrap air intermixed with the exhaust gases in order to obtain the desired effect, and provisions must be made for mixing prior to contact with the catalyst. It will be recognized that mixing the air and exhaust gases will require some finite time interval. In general the shorter the time interval, the less chance for premature reaction. However, this must be considered along with the advantages of obtaining good mixing and practical means for doing so. Mixing means are known and available which provide the required degree of mixing in acceptable time intervals. It is preferred to add the bootstrap air immediately before contact with the rhodium/nickel catalyst, and to rapidly mix the air with the exhaust gases prior to such contact. However, the air can be admixed earlier, and the extent to which desirable results are obtained will be a function of the temperature, time, and other factors possibly initiating a premature reaction.

It will be advantageous to employ rapid mixing means. It is desirable that the streams of air and exhaust gases be intermingled, as by turbulent mixing, prior to contacting the catalysts. If there were streamline flow with separate streams of the exhaust and air going through the catalyst, the benefits of the bootstrap air addition would not be obtained.

The premature reaction of bootstrap air is undesirable as it is virtually non-selective and may leave undesirable amounts of hydrogen in the exhaust gases. It is therefore advantageous to avoid or minimize such reaction. Temperature has an important bearing upon the tendency toward premature reaction. At temperature up to about 700°C there is ordinarily little tendency toward the homogeneous reaction, while the tendency toward such reaction becomes pronounced between 700° and 800°C, although these values may vary with the surroundings, time, etc. It is possible to rapidly admix air and exhaust gases in short time intervals at temperatures up to 750°C, or so without much reaction but this becomes more difficult or uncertain as temperatures range on up to 800°C or higher. However it may be feasible to avoid reaction at these or even higher temperatures by optimization of jet or other mixing methods as applied to the large flow involved in automotive exhaust. The temperatures referred to are oven measurement temperatures, and it will be appreciated that actual gas or catalyst temperatures could range considerably higher due to exothermic reactions. Similar considerations could, of course, obtain in an automobile exhaust gas stream. The actual temperatures at the inlet to an $NO_x$ catalyst converter can, of course, vary with the location of the converter, modes of engine operation, and other factors. However, with the converter located in a post manifold position, the temperatures are expected to be in the 600° to 700°C range ordinarily, while possibly ranging up to temperatures over 800°C occasionally with particular driving modes. Thus it can be seen that the present invention can advantageously be employed. The addition of the bootstrap air downstream from the manifold avoids exposure of the air-exhaust mixture to the high manifold temperatures. The $NO_x$ converter inlet temperatures, although more moderate, can cause premature reaction, and the addition procedures make it possible to shorten exposure of the admixture to such temperatures. This will be more important for some inlet temperatures than for others, but is generally advantageous in view of the ranges of temperatures which can be expected in the usual modes of engine operation.

The time factor is important in avoiding premature reaction but its influence cannot readily be quantified. The tendency toward premature reaction of the oxygen is influenced by temperature, gas composition, possible initiators, and other factors, as well as by time. Moreover once a homogeneous oxidation reaction is started, it may go very rapidly to virtual completion. Despite this, utilizing a short mixing time usually has beneficial results. Even if the temperature is so high that some homogeneous reaction will almost necessarily occur, the short exposure may lessen the amount of such reaction. Moreover the exhaust gas stream is a flowing mixture of varying composition and varying temperature profiles. If a homogeneous reaction occurs at a particular stage and composition, it does not follow that such a reaction will necessarily occur to the same extent when apparently similar compositions and conditions again occur, as a different time factor or unknown factors may be involved. Thus shortening the exposure time can lessen the opportunity for such homogeneous reactions. The procedures taught herein may not avoid premature reaction of the bootstrap air under all temperature and other conditions which may be encountered. Nevertheless the procedures will give greatly improved results under some of the conditions encountered, and will thereby improve the results on an overall basis with respect to the average level of pollutant emissions. The selective oxidation utilized herein has advantages even if practiced only on an intermittent or partial basis rather than continuously throughout the range of engine operations.

Rapid mixing can be employed in order to shorten the time during which premature reaction might occur. Even though a particular time interval is suitable for some conditions, there may be advantage in using a shorter mixing time in the event other conditions are encountered. Thus while a time of 50 milliseconds or greater might be appropriate under some conditions, there will generally be advantages in use of shorter mixing times. For example, a time less than 20 milliseconds can be employed, for example a time of 10 milliseconds or less is advantageous, and it will be advantageous to use a time of 5 milliseconds or such lesser values as 2 milliseconds or 1 millisecond in so far as suitable mixing can be attained.

Various means can be employed to admix the bootstrap air rapidly into the exhaust gas stream. The bootstrap air should be intimately intermingled with the exhaust gases, as by turbulent mixing, rather than present as a separate stream when encountering the rhodium/nickel catalyst. For example, the type of combustible mixture of air and other gases formed in a gas burner is ordinarily suitable. Various types of turbulent mixing can be employed to obtain an intimate mixture rapidly. Jet mixers or injectors of various kinds can suitably be employed. A two-jet mixer can be employed in which a jet of air impinges on a jet of the exhaust gases, in the manner used in oxyhydrogen torches or for mixing or other combustible gases. Various types of injectors can be employed in which a stream of air in an auxiliary pipe, jet, nozzle or tube, or orifice is injected into the exhaust stream in a main pipe. Mixing nozzles can be employed in which one gases passed through a narrow slot and then entrains gas from a concurrent stream. In such a nozzle it will usually be advantageous to have the one gas, e.g. air, added with a velocity at least 2 or 3 times that of the main stream. In an automobile exhaust stream, the air could be injected into the stream, say two pipe diameters upstream of the catalytic converter, with perhaps two to four injection points around the circumference of the exhaust pipe being appropriate.

It is, of course, recognized that air can be added for purposes and at locations other than those of primary interest herein, and the catalysts and bootstrap operations described herein can be utilized in conjunction with procedures in which air is added at cylinder ports or, otherwise in the exhaust manifold, or in advance of an oxidation converter, or generally to use an $NO_x$ converter for oxidation during initial phases of engine operation. In the event air is added anywhere upstream of the $NO_x$ converter, such addition should be taken into account in determining A/F ratio and the proper amount of bootstrap air to utilize.

In utilizing bootstrap operations herein, hydrogen may be substantially removed from the exhaust gases over the rhodium containing catalyst. To accomplish this, oxygen can desirably be provided in an amount which is from 80% of stoichiometric up to stoichiometric with oxidizable components at the lean edge of the A/F operating range.

The present catalyst utilizes a particular combination of components to achieve a desired effect. It will be understood, of course, that various other active or inactive components can also be present so long as the required components are present and in the proper arrangement. It may be desirable to have various noble metals, e.g. platinum, palladium, ruthenium, present in small amounts in the nickel, and similarly it may be desireable to employ promoters with the rhodium. It will be understood that the catalysts as described and defined herein include catalysts containing such other components. The catalysts will ordinarily consist essentially of the named components, but as in the usual interpretation of "consist essentially", will remain open to the presence of other components in amounts which do not have a basic deleterious effect upon the properties of such catalyst.

The catalysts of the present invention have rhodium highly dispersed on an alumina surface, preferably an activated alumina surface. Transition aluminas are suitable for use. By the term transition alumina is meant an alumina which is essentially alumina other than alpha-alumina and also other than certain hydroxides of aluminum. Reference is made to Technical Paper No. 10, second revision, from the Alcoa Research Laboratories. On page 9, various phases of alumina are enumerated. The following alumina phases are not generally components in the finished catalysts of the present invention.

| | |
|---|---|
| alpha-alumina tri-hydrate | Gibbsite |
| beta-alumina tri-hydrate | Bayerite |
| alpha-alumina monohydrate | Boehmite |
| beta-alumina monohydrate | Diaspore |
| Alpha-alumina | Corundum |

The use of substantial quantities of the above cited phases is not generally made. Small amounts of such alumina phases may be present, but are not the preferred starting materials for preparing the catalysts of the present invention. A preferred support for the rhodium in the present invention is composed predominantly of a transition alumina. Thus, a preferred alumina support for the rhodium in the present invention may be composed predominantly of one or more of the alumina phases typified by various forms of gamma or eta alumina, or theta, iota, chi, kappa aluminas, among others.

The form of the support may depend upon the specific application. However, it is likely that use of a monolithic carrier will be appropriate in view of the favorable heat-up properties of such carriers. Nevertheless the rhodium, alumina, nickel layered coatings can be utilized whether or particles or on rigid, geometrical forms. For example, particle forms are exemplified by spheres, extrudats, rings, hollow cylinders, granules, or other shapes. Likewise, monolithic supports, whatever their composition, can be coated with the specified materials.

Coatings can be applied in a variety of ways. A successful procedure involves use of dispersions of alumina powder. The dispersion is conveniently made by use of acidic aqueous suspensions created by agitation. Among the acids which can be used are acetic, hydrochloric or nitric. A simple, effective procedure for obtaining the amount of coating required utilizes, on a weight basis, 20.0 g alumina powder, 1.2 g conc. $HNO_3$, and 78.8 g $H_2O$. The alumina power is added to the acidified water and then shaken vigorously to obtain a suspension. Such suspensions appear to be stable for at least two hours.

In the catalysts used herein the rhodium is preferably well-dispersed on the surface of the alumina support without much penetration into the surface of alumina particles. To obtain the desired effect from the very minute amounts of rhodium involved, it is essential to have the rhodium in position to contact the exhaust gases. It also appears advantageous that the alumina, prior to rhodium depositions, be characterized by open pores with a minimum of small pores, as it appears that rhodium deposited in small pores is subject to occlusion so as to prevent effective catalytic contact. It has been found that precalcining the alumina-containing body prior to deposition of the rhodium produces a catalyst of better and more stable activity. It appears that the pre-calcination has the effect of reducing the size of or closing small pores, thereby preventing penetration of the rhodium salts into such pores and resulting in a greater concentration of the metals on the exposed surface of the alumina.

Monolithic supports can be used to advantage in the present invention. Such monolithic supports consist of unitary refractory or ceramic structures characterized by a plurality of relatively thin-walled cellular channels passing from one surface to the opposite surface, thus providing a large amount of geometrical surface area. The channels can be of one or more of a variety of cross-sections selected from a variety of shapes and sizes, each space being confined by ceramic wall. Cross sections of the support represent a repeating pattern which can be described as lattice, corrugated, honeycomb, etc.

The dimensions of a suitable monolithic carrier for use in the present invention will depend on many factors including position of use in the exhaust train. Positions closer to the engine will favor more rapid heat-up as a consequence of higher exhaust gas temperatures. Generally speaking, when used in the post-manifold position, the volume of each monolith will be between about 15 and 80 in.$^3$ and will have from about 8 to about 14 corrugations per inch. Wall thicknesses will be from about 0.005 to 0.015 inch thus creating an open area on the fact of the monolith of about 50 to 70%.

The chemical composition of the monolithic or other support forms can consist of a-alumina, mulite, cordierite, spodumene, Zircon, Alundum, magnesium silicate, petalite, or combinations thereof, the refractory body being formed from these materials together with a suitable binder, such as clays, calcium carbonate, calcium aluminate, magnesium aluminate or combinations thereof. Generally, in the process of forming the rigid structure considerable porosity develops in the cell walls. For example, water absorptivities with $\beta$-spodumene monoliths may be 20 to 30% by weight. Inert support materials capable of accepting nickel deposition are advantageous in providing a better base for fixing the nickel component than do activated alumina coatings. Inert materials, in contrast to the activated, sorptive transition aluminas used to disperse rhodium in active catalyst form, tend to have lower surface areas and activity and are classed as inert support materials.

The refractory bodies will have coatings of the designated materials deposited thereon. With the coating techniques outlined herein, the coatings are fairly uniformly distributed through the channels, and inside the cell walls. Pores are generally blocked by the coatings. Coating thicknesses are on the order of one micron with a 5% alumina coating.

Alumina coatings on monoliths, when precalcined, will have surface areas in the range of about 50 to 200 $m^2/g$ depending on precalcination temperature, when considered on the basis of alumina coating weight alone.

The coating techniques and requirements are equally applicable to non-unitary, non-rigid substrates.

EXAMPLE 1

A catalyst was prepared by first depositing nickel on a monolith, then alumina, and finally rhodium. The monolith used was a cordierite monolith having straight through channels, 200 channels per square inch, with hydraulic diameters of about 0.06 inch, porosity of about 30%, and surface area of about 50 square inches per cubic inch. The monolith was impregnated by immersion in a nickel salt solution having a concentration of 900 grams Ni $(NO_3)_2 \cdot 6H_2O$ for 300 grams water. The monoliths were dipped up and down a number of times in the solution and then immersed for 10 to 25 minutes or so. Excess solution was removed in an air stream and the monoliths were then dried at 120°C for 1–2 hours, followed by calcination in air at 550°C for 2 hours. The impregnated monoliths were then coated with alumina from a 20% alumina dispersion. The alumina dispersion was prepared by adding 40 grams of alumina powder (Dispal M) to a solution of 1.2 grams concentrated nitric acid in 78.8 grams distilled water, and shaking for about 10 minutes. The monolith was completely immersed for upwards of 10 minutes, with occasional dipping up and down. Excess solution was removed with an air stream and the coated monolith was dried at 120°C for 2 to 4 hours and calcined 5 hours at 600°C. Rhodium was then applied by immersion in a rhodium nitrate solution for fiteeen minutes with occasional dipping up and down. The solution had rhodium content of 9 micrograms per ml. Excess solution was removed with an air stream, and the impregnated monolith was dried at 120°C for 2½ hours. Approximately 0.002 weight parts rhodium had been added per 100 weight parts original monolith. The catalytic monolith at this stage was subjected to the usual exhaust gas test conditions. It was then impregnated with additional rhodium, using a 13.5 microgram/ml concentration and the same impregnation and drying procedure. The thus prepared dual catalyst had about 5 weight parts nickel, 3 weight parts alumina, and 0.005 weight parts rhodium per 100 weight parts of monolith. The Rh/Ni catalyst with the nickel dispersed on a bare monolith, and rhodium dispersed on an alumina coating, was effective for removal of $NO_x$ as shown from the results in Tables 2, 3 and 4 below. Prior to testing, the catalyst was aged at 870°C for 15 hours in a gas mixture simulating a −1.5 Δ A/F ratio. For comparison, a similarly aged catalyst was employed having the same rhodium and alumina content but without the nickel undercoating. For convenience, the Rh/Ni catalyst is referred to as an Rh/Ni layered catalyst.

A gas stream was sampled to determine the extend to which oxidation might occur at particular temperatures prior to contacting catalyst. The usual test apparatus for measuring $NO_x$ catalyst effectiveness was employed, but without a catalyst and with sampling at the usual place of initial contact with catalyst. A simulated gas mixture was employed to correspond to a −1.5 Δ A/F carburetion, with addition of 4.3% bootstrap air. In the procedure the gas mixture passed through an annular preheater of about 15 ml volume at a rate of 4200ml/minute (STP). The preheater and catalyst were housed in a temperature controlled furnace. Results were as reported in Table 1.

Table 1

|  | $\Omega$ | % Remaining $NO_x$ | $H_2$ | $O_2$ | CO |
|---|---|---|---|---|---|
| 700°C Furnace | 99 | 95 | 99 | 98 | 100 |
| 800°C Furnace | 93 | — | 58 | 5 | 72 |

From the data it is apparent that at the higher temperature oxygen reacted in an essentially non-selective manner with the carbon monoxide and hydrogen.

The feed system to the test apparatus was then adjusted to provide a pre-combusted mixture corresponding to that at 800°C in Table 1, and the effectiveness of catalysts in removing $NO_x$ from the mixture was determined. The space velocity was 90,000 hr-1. For comparison, the same mixture (−1.5 Δ A/F, 4.3% bootstrap air) but without pre-combustion was employed. Furnace temperature was adjusted as necessary to obtain a catalyst temperature of 700°C. Results are reported in Table 2.

Table 2

|  | $\Omega$ Without Precombustion | With Precombustion |
|---|---|---|
| Rh/Ni Lay. Cat. | 5 | 17 |
| Rh Cat. | 8 | 52 |

It can be seen from the foregoing that the laminar rhodium/nickel catalyst is much better able to compensate for precombustion of the bootstrap oxygen than is a rhodium only catalyst. It may be possible to minimize or substantially avoid precombustion by adding the bootstrap air shortly before catalyst contact and limiting exposure to high temperatures as further taught in my copending application Ser. No. 324,286 filed 1/17/73. However some high temperatures and precombustion may still occur occasionally in some modes of engine operation and it is advantageous to provide an ability to compensate therefor.

Another advantage of the combined rhodium and nickel catalyst is improved ammonia selectivity, as shown by a lower $\Omega$ at the rich edge of operating conditions, e.g. at −1.7 Δ A/F with a 4.3% bootstrap air addition. Comparative results for this carburetion extreme are shown in Table 3, at the nominal bootstrap air rate, along with results at such carburetion extreme and the worst case bootstrap air rate, 3.5%, obtainable with ± 20% error on the bootstrap air addition.

Table 3

| A/F, added air | Rh Cat. | Ω Rh/Ni Lay. Cat. |
|---|---|---|
| −Δ1.7, 4.3% | 14 | 9 |
| −Δ1.7, 3.5% | 26 | 17 |

The better results at 4.3% bootstrap air also demonstrate the effect of bootstrap air and the advantage of adding it in preferred amounts with respect to the selected A/F ratio.

Another advantage of the rhodium/nickel catalyst is enhanced cold-start performance as measured by the NOXIM test with a 500°C furnace, −Δ1.5 A/F and 4.3% bootstrap air, and 17% secondary air during the first 2 minutes from cold start. In the NOXIM test the hydrocarbon (HC) and carbon monoxide (CO) data represent the integrated performance of the $NO_x$ catalyst acting as an oxidizing catalyst during the 2 minute cold start, while the Ω value represents the integrated performance during minutes 3 to 5 following the cold start, and represents the second cycle of a government established test (CVS test). Results are:

Table 4

| | % Remaining | |
| | Rh Cat. | Rh/Ni Lay. Cat. |
|---|---|---|
| HC | 91 | 84 |
| CO | 36 | 27 |
| Ω | 19 | 14 |

EXAMPLE 2

A rhodium and nickel catalyst was prepared by depositing nickel on a monolith, coating with alumina, and depositing rhodium. The catalyst was employed to remove $NO_x$ from gases in a test in which the amount of oxygen in the gases was varied to determine the effect upon catalyst efficiency. The gases contained constant amounts of CO and $H_2$ to correspond to rich carburetion, and the results, in terms of approximate Ω values, are reported below with respect to variance in the $CO/O_2$ ratio in the test gas. The $CO/H_2$ ratio was set at 3.2.

Table 5

| $CO/O_2$ | Ω |
|---|---|
| 3.0 | 6.45 |
| 3.6 | 7.35 |
| 4.15 | 9.45 |
| 4.6 | 12.0 |
| 5.45 | 16.5 |

There is advantage in operating at the lower $CO/O_2$ ratios, such as below 5 or even lower, down to the stoichiometric point. By employing a bootstrap operation in which rich carburetion is combined with addition of proper amounts of supplemental air, it is possible to maintain low $CO/O_2$ ratios over broader ranges of A/F ratios, and such bootstrap operation is ordinarily advantageous with the catalysts of the present invention.

EXAMPLE 3

A mixing apparatus was provided in which a jet of air could be rapidly admixed with a simulated exhaust gas stream by impinging upon a jet of the stream shortly before contacting a catalyst. The feed conduit to the apparatus was provided with a valve so that the bootstrap air could be added upstream of the apparatus (slow mix) rather than by the dual jet mixing (fast mix). A simulated exhaust gas corresponding to −1.5 Δ A/F was employed and 4.3% bootstrap air was added, with results as reported in Table 6.

Table 6

| | Oven Temp. (°C) | % Remaining | |
| | | Ω | $NO_x$ |
|---|---|---|---|
| Rh Cat. | | | |
| Slow Mix | 750 | 26 | 14 |
| Fast Mix | 800 | 23 | 13 |
| Rh/Ni Lay. Cat. | | | |
| Fast Mix | 700 | | 3 |
| Fast Mix | 800 | 5 | 0 |

The layered Rh/Ni catalyst employed in Example 3 was prepared as follows. Nickel was impregnated on a monolith by dipping the monolith for two minutes into a solution containing a concentration of 0.236 gram nickel per cc. (as $Ni(NO_3)_2$). The channels of the monolith were cleared of excess liquid and the monolith was dried at 120°C, and calcined in air at 550°C. The nickel-coated monolith was then coated by dipping into a 20% alumina dispersion for 2 minutes, cleared of excess liquid, dried at 120°C, and calcined at 600°C. The coated monolith was then impregnated with rhodium by dipping into a rhodium nitrate solution containing 0.000125 gram Rh/ml. Excess solution was removed and the coated monolith was dried at 120°C. The catalytically-coated monolith was then aged for 16.5 hours at 870°C in a simulated exhaust gas stream (−1.5 Δ A/F). The final composition was about 15.74 weight parts nickel, 4.2 weight parts alumina and an outer impregnate of 0.02 weight parts rhodium, per 100 weight parts monolith.

EXAMPLE 4

Gas mixtures were employed as in Example 1 to simulate a precombusted mixture of exhaust gas and air, and a mixture without precombustion. The gas mixtures were used to determine the effectiveness of catalysts with results as reported in Table 7. The same Rh/Ni catalyst was used as in Example 3.

Table 7

| | % Remaining | | |
| | Ω | $NO_x$ | $H_2$ |
|---|---|---|---|
| Rh/Ni Lay. Cat. | | | |
| pre-combust. | 21 | 8 | 30 |
| w/o pre-combust. | 5 | 2 | 0 |
| Rh Catalyst | | | |
| pre-combust. | 52 | — | 30 |
| w/o pre-combust. | 9 | 2 | 0 |

It is apparent that the premature reaction of oxygen has a deleterious effect upon the catalyst performance, although the Rh/Ni layered catalyst performance is still fair. The poor performance of the pre-combusted mixture also appears related to the continued presence of substantial amounts of hydrogen.

EXAMPLE 5

A nickel on monolith catalyst was prepared by ordinary deposition procedures, such as those described in Example 1. The nickel-coated monolith was calcined at elevated temperature. Small amounts of platinum and rhodium were also deposited from salt solution to be included in the nickel coating. The thus coated monolith had 10.11 weight parts nickel, 0.005 weight parts platinum, and 0.005 weight parts rhodium per 100 weight parts of the monolith. The rhodium and platinum were included as promoters to enhance the reducibility of nickel oxides or other oxidized forms of the nickel, but are not essential to the effectiveness of the nickel component. A cordierite monolith as described in Example 1 was employed. The coated monolith was then coated with alumina by dipping in a 20% aqueous dispersion of alumina powder (Dispal M). Two successive dippings were used, with drying at 120°C followed by calcining at 600°C. The total amount of alumina present after calcination was 4.31 weight parts per 100 weight parts of the monolith. The thus coated monolith was then impregnated with rhodium by immersion in a rhodium nitrate solution having a concentration of 9 micrograms rhodium per ml., followed by drying at 120°C. The amount of rhodium thus provided was 0.0026 weight parts per 100 weight parts monolith. The thus prepared Rh/Ni layered catalyst was tested in the state as made, and after hydrothermal aging (HTA) at an inlet temperature of 870°C, for 22 hours. For comparison, a 0.0025% rhodium on alumina-coated monolith (β-spodumene) was employed. Also a sequential rhodium and nickel catalyst was used for comparison, in which the described rhodium catalyst was followed by a nickel catalyst on an uncoated monolith. For further comparison, an additional catalyst, designated as a co-catalyst is included, in which both rhodium and nickel were deposited on an alumina coated monolith. The co-catalyst had 3 weight parts alumina, 5 weight parts nickel, and 0.002 weight parts rhodium per 100 weight parts monolith. Results were as follows, employing a −1.5 Δ A/F feed with 4.3% bootstrap air:

Table 8

|  | Ω at Inlet Temp. | | |
|---|---|---|---|
|  | 800°C | 750°C | 600°C |
| Lay. Rh/Ni | | | |
| Fresh | 12 | | 8.5 |
| HTA | 5 | 6 | 6 |
| Rh | | | |
| HTA | 42 | 23 | 15 |
| Seq. Rh + Ni | | | |
| HTA | 12 | 8 | 11 |
| Co-cat. Rh/Ni | | | |
| Fresh | 8 | | 15 |
| HTA | 8 | | 10 |

The rhodium/nickel layered catalyst gave good results even at fairly high inlet temperatures, and also gave a surprising improvement in performance upon aging. It will be noted that the performance from the additive effect of the nickel and rhodium in the sequential arrangement is inferior to that of the Rh/Ni laminar catalyst, even though the latter catalyst occupies only one-half the volume of the combined systems. Several of the catalysts were then tested in a NOXIM test at an oven temperature of 500°C, with results as follows:

Table 9

|  | Ω | % Remaining HC | CO |
|---|---|---|---|
| Lay. Rh/Ni | | | |
| Fresh | 18 | 79 | 26 |
| HTA | 13 | 85 | 35 |
| Rh | | | |
| HTA | 18 | 96 | 34 |
| Co-cat. Rh/Ni | | | |
| Fresh | 25 | 77 | 21 |
| HTA | 19 | 97 | 34 |

From tables 8 and 9 it can be seen that the layered Rh/Ni structure compares favorably in effectiveness with the co-catalyst structure.

EXAMPLE 6

Accelerated aging tests were conducted with the layered rhodium/nickel catalysts described herein to determine resistance to aging under conditions possibly occurring in use. In the test the catalyst was subjected at 750°C to a gas stream corresponding to a rich A/F ratio with the proper amount of bootstrap air addition, with an additional 17% air pulse (1 minute on, 1 minute off) over the course of a 1-hour test period. This provides a cycle of high temperature oxidizing and reducing conditions such as might occur in certain vehicle driving modes. The layered catalysts exhibited little change in activity over the course of a fifteen cycle test. This is a very severe test, and equivalently severe aging might occur only after prolonged vehicle operation. A rhodium and nickel on alumina co-catalyst, as described herein, also showed activity retention in the aging test. However, it was observed that the co-catalyst became fluffy with spalling of the actives coating, indicating that it would eventually lose activity because of physical degradation, and loss of catalytically active components. Apparently some latice size changes in the oxidation-reduction cause physical degradation.

For much of the catalyst evaluation discussed herein, a special CRANOX testing system was used. CRANOX (Catalytic Removal of Automotive $NO_x$) is a fully automatic catalyst testing system controlled by a special-purpose digital controller. The control system is capable of testing a single catalyst at six different feed compositions (varying the air/fuel ratio) and at up to 256 different temperature levels. All pertinent data are acquired by the system, processed through a digital integrator and teletypewriter which generates a paper tape record of the run. This tape is processed by off-line computer which generates tables and graphs of catalyst performance parameters.

The CRANOX analytical system uses a dual-bed technique to determine the sum of ammonia and unconverted $NO_x$ leaving the reactor: a metered sample of the reactor product is diluted with a metered quantity of air and the mixture passed over a platinum-on-alumina oxidation catalyst. The effluent is then sent to an electrochemical transducer which measures the sum of NO and $NO_2$, an electrochemical cell operating on the principle of a fuel cell (Dynasciences NX-130 analyzer) being used for this purpose. Oxidation reactor conditions were found that resulted in quantitative conversion of ammonia to $NO_x$. The determination of the sum of ammonia plus unconverted $NO_x$ is an especially important measure of the effectiveness of an automotive NO$_x$ catalyst as it measures the worst-case performance that might be achieved in an actual dual-bed converter that would oxidize any ammonia formed in the NO$_x$ converter back to NO$_x$ in the oxidation converter.

The CRANOX feed-gas system generates the six feeds by synthetic dynamic blending of eight components to achieve a simulated automotive exhaust that is very close to an actual exhaust in which the air/fuel ratio is varied by carburetion changes. The flow rate over the test catalyst can be held constant, for example at 4200 ml/min (STP) for all catalyst feeds. With a normal catalyst sample of 3 ml. this results in a space velocity of 80,000 hr$^{-1}$. A space velocity of 90,000 hr$^{-1}$ is also often employed. The catalyst is contained in a quartz tube 16 mm. I.D. which is in turn contained in a quartz test tube 25 mm O.D. The flow pattern is arranged such that the incoming feed is preheated by flow through the annular space between the two tubes. This also results in near-adiabetic operation of the inner tube containing the catalyst. Both tubes are housed in a furnace consisting of a 1¼ inch stainless steel pipe maintained at a controlled temperature by radiant heat transfer from electrically heated coils surrounding the pipe. In the tests herein, a specified bootstrap air rate was generally employed with a specified −Δ A/F. Such factors correspond to particular concentrations of exhaust gas components. For example, a −1.0 to 0 Δ A/F range, with no air addition, corresponds to about 3.28% CO and 0.12 O$_2$ at the rich edge, and 0.7% CO and 0.51 O$_2$ at the lean edge. A −1.7 to −0.7 Δ A/F range after addition of 4.3% bootstrap air corresponds to 4.04% CO and 0.98% O$_2$ at the rich edge, and 1.82% CO and 1.18% O$_2$ at the lean edge.

EXAMPLE 7

A catalyst was prepared by depositing 6 parts of nickel, followed by 0.01 parts rhodium per 100 parts cordierite monolith. The depositions were accomplished in the usual manner, but omitting the usual alumina layer. A similar catalyst was prepared with 6 parts nickel, 3.5 parts alumina and 0.008 parts rhodium. The material was calcined at 870°C after deposition of the alumina coating. The catalysts were tested at 600°C in a bootstrap procedure, employing feed gases of different A/F ratios, with results as follows:

Table 10

| Ni/Rh Cat. | Ω at Δ A/F | | |
|---|---|---|---|
| | −1.7 Δ | −1.5 Δ | −1.0 Δ |
| Fresh | 16 | 12 | — |
| HTA | 27 | 23 | 8 |
| Ni/Al$_2$O$_3$/Rh Cat. | | | |
| Fresh | 12 | 7 | 2 |
| HTA | 10 | 6 | 2 |

While the catalyst will work without the alumina layer, the advantage of the alumina layer is apparent. The catalysts were then tested in a NOXIM test at 500°C.

Table 11

| Ni/Rh Cat. | Ω | HC | CO |
|---|---|---|---|
| Fresh | 24 | 90 | 36 |
| HTA | 47 | 98 | 63 |

Table 11-Continued

| Ni/Rh Cat. | Ω | HC | CO |
|---|---|---|---|
| Ni/Al$_2$O$_3$/Rh Cat. | | | |
| Fresh | — | — | — |
| HTA | 14 | 83 | 26 |

EXAMPLE 8

A layered catalyst was prepared containing 6 weight parts nickel, 1.7 weight parts alumina, and 0.004 weight parts Rh per 100 weight parts monolith, the materials being deposited in the stated order. The alumina coated monolith was calcined at 600°C prior to deposition of the rhodium. A similar catalyst containing the same nickel and rhodium contents and 3.6 weight parts alumina, was calcined at 870°C after the alumina deposition. The catalysts were dried at 120°C, hydrothermally aged and tested at 600°C with results as follows:

Table 12

| Catalyst | Ω at Δ A/F | |
|---|---|---|
| | −1.7 | −1.5 |
| 600°C calcine | 17 | 11 |
| 870°C calcine | 10 | 7 |

The catalysts were then tested in a NOXIM test at 500°C.

Table 13

| Catalyst | Ω | % remaining HC | CO |
|---|---|---|---|
| 600°C calcine | 18 | 89 | 31 |
| 870°C calcine | 16 | 91 | 37 |

It can be seen that the calcination at higher temperature made the catalyst considerably more effective in reducing NO$_x$ emissions, presumably because of some reduction of pore size or surface area of the alumina coating. Moreover the NO$_x$ emission results were essentially equivalent to those obtained on the same type of layered catalyst prepared with an 870° calcination but with twice the rhodium content, 0.008 weight part. Thus the precalcination is also advantageous in making it feasible to reduce the content of the scarce rhodium component. The results indicate it is desireable to calcine the alumina coated material at temperatures above 600°C, with a temperature of about 870°C or higher being suitable. The changes leading to the improved results are presumably a gradual phenomenon, but temperatures of 700° to 750°C or above 700°C would probably be sufficient to obtain most of the benefits of precalcination, depending somewhat on the heating time. The heating at 870°C in a muffle furnace for 3½ hours is accompanied by a change in appearance in that the material becomes a much brighter green, compared to the grey green of material calcined only at 600°C. This apparently indicates more nickel aluminate formation, and the nickel aluminate appearance can be used as a rough gauge of sufficient precalcination to achieve improved activity, although changes in surface area may be as or more significant than changes in chemical form.

The transition aluminas employed herein as the alumina coating include both gel-derived and crystalline-derived aluminas, although it is indicated that somewhat better performance can be obtained with the gel-derived aluminas.

As described herein, the rhodium-nickel layered catalyst has advantages for removal of nitrogen oxides from exhaust gases, particularly in the higher ranges of temperatures encountered. The usefulness of the catalyst is also enhanced by the use of bootstrap operations as described herein, especially under conditions to avoid premature reaction of the oxygen. However, regardless of how or where air is added or the amount of premature reaction, good results can be achieved in a bootstrap operation if the oxygen is in proper ratio to the carbon monoxide and hydrogen at the time the catalyst is contacted. Of course there will be an economic penalty if excessively rich carburetion is employed to allow for addition of high amounts of air and premature reaction. It will therefore generally be preferable to operate under conditions to avoid or substantially minimize premature reaction.

EXAMPLE 9

A good rhodium/alumina/nickel on monolith catalyst, having an $\Omega$ of 6 upon testing at 600°C and $-1.5$ $\Delta$ A/F, was tested to determine the extent to which activity was recovered after oxidation. The catalyst was aged in air at 800°C for one week. The initial $\Omega$ value was then 80, but the value declined to 55 after exposure to the $-\Delta 1.5$ A/F stream for 6 minutes. After 10 minutes exposure at 870°, the value was 9, and the catalyst then gave a test value of 7 at 600°C.

I claim:

1. A catalyst comprising nickel disposed on an inert support and an alumina coating thereover upon which coating an amount of rhodium no greater than 0.1 weight part per 100 weight parts inert support is dispersed, with the nickel and rhodium being oxides or in elemental form.

2. The catalyst of claim 1 in which the amount of rhodium is less than 0.01 weight parts per 100 weight parts inert support.

3. The catalyst of claim 1 in which the amount of nickel is in the range of 0.5 to 50 weight parts and the amount of alumina in the range of 0.1 to 20 weight parts, each per 100 weight parts inert support.

4. The catalyst of claim 3 in which the amount of rhodium is 0.0005 to 0.05 weight parts.

5. The catalyst of claim 1 in which there are at least 5 weight parts nickel, 2 to 6 weight parts alumina, and the amount of nickel is at least twice that of alumina.

6. The catalyst of claim 1 in which the support is a monolith.

7. The catalyst of claim 1 in which the support is a cordierite monolith.

8. The catalyst of claim 1 in which nickel is deposited on a monolith, followed by an alumina coating, and then rhodium is deposited.

9. A catalyst comprising nickel fixed on an inert support and alumina deposited as a coating over the nickel with rhodium dispersed upon the alumina in an amount of 0.0005 to 0.05 weight parts per 100 weight parts inert support, with the nickel and rhodium being oxides or in elemental form.

10. The method of preparing a catalyst by impregnating an inert support with a nickel salt solution, drying and calcining; then coating alumina thereon from an alumina suspension, drying and calcining; and then calcining the coated support with a rhodium salt solution, drying, and calcining to decompose the rhodium salt.

11. The process of claim 10 in which the coating of alumina is followed by calcining at temperature above 700°C prior to impregnating with the rhodium salt solution.

12. The process of claim 10 in which the coating of alumina is followed by calcining at 870°C to the appearance of nickel aluminate, becoming a much brighter green than that characteristic of material calcined at 600°C, prior to impregnating with the rhodium salt solution.

13. The process of claim 10 in which the drying and calcining steps are at 110° to 200°C and 400° to 600°C, respectively and the amounts are such as to give 0.5 to 50 weight parts nickel, 0.1 to 20 weight parts alumina, and 0.0005 to 0.05 weight parts rhodium, per 100 weight parts inert support.

* * * * *